(12) United States Patent
Watanabe et al.

(10) Patent No.: US 9,157,425 B2
(45) Date of Patent: Oct. 13, 2015

(54) INVERTER-INTEGRATED ELECTRIC COMPRESSOR

(75) Inventors: Takayuki Watanabe, Tokyo (JP); Hiroyuki Kamitani, Tokyo (JP); Takayuki Takashige, Tokyo (JP); Masayuki Ishikawa, Tokyo (JP); Takeshi Hirano, Tokyo (JP); Yuki Ichise, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 744 days.

(21) Appl. No.: 13/265,590

(22) PCT Filed: Sep. 22, 2010

(86) PCT No.: PCT/JP2010/066407
§ 371 (c)(1), (2), (4) Date: Oct. 21, 2011

(87) PCT Pub. No.: WO2011/037136
PCT Pub. Date: Mar. 31, 2011

(65) Prior Publication Data
US 2012/0045353 A1 Feb. 23, 2012

(30) Foreign Application Priority Data
Sep. 24, 2009 (JP) .................. 2009-219175

(51) Int. Cl.
*F04B 35/04* (2006.01)
*F04C 23/00* (2006.01)
(Continued)

(52) U.S. Cl.
CPC .............. *F04B 35/04* (2013.01); *F04C 23/008* (2013.01); *H02K 11/0073* (2013.01);
(Continued)

(58) Field of Classification Search
CPC ............... H02K 5/525; H02K 11/0073; F04B 2203/0204; F04C 2270/095
USPC .......... 417/410.1, 423.4, 44.1, 423.7; 310/71; 363/109
See application file for complete search history.

(56) References Cited

U.S. PATENT DOCUMENTS 5,675,223 A * 10/1997 Yoshizawa et al. ........... 318/139
6,501,662 B2 * 12/2002 Ikeda ............................ 361/760
(Continued)

FOREIGN PATENT DOCUMENTS

JP    2000-224861 A    8/2000
JP    3270186 B2       4/2002
(Continued)

OTHER PUBLICATIONS

International Search Report of PCT/JP2010/066407, mailing date Dec. 21, 2010.
(Continued)

*Primary Examiner* — Peter J Bertheaud
*Assistant Examiner* — Dominick L Plakkoottam
(74) *Attorney, Agent, or Firm* — Westerman, Hattori, Daniels & Adrian, LLP

(57) ABSTRACT

Provided is an inverter-integrated electric compressor in which the layout of a wiring path connected to an IPM is optimized, the wiring path is simplified, and the noise interference due to disturbance is suppressed, thereby improving the controllability. In an inverter-integrated electric compressor in which an inverter box is provided on the outer periphery of a housing accommodating a compressor and a motor, the inverter box integrally accommodating an inverter device, the inverter device includes an IPM constituting an inverter circuit, and UVW output terminals arranged on one side of the IPM are disposed, in the inverter box, so as to face a glass-sealed terminal that applies power from the inverter device to the motor.

19 Claims, 8 Drawing Sheets

(51) Int. Cl.
*H02K 11/00* (2006.01)
*H02M 7/00* (2006.01)
*H02K 5/22* (2006.01)

(52) U.S. Cl.
CPC .......... *H02M 7/003* (2013.01); *F04C 2240/30* (2013.01); *F04C 2240/803* (2013.01); *F04C 2240/808* (2013.01); *F05C 2201/021* (2013.01); *H02K 5/225* (2013.01)

(56) References Cited

U.S. PATENT DOCUMENTS

| | | | |
|---|---|---|---|
| 6,619,933 B2 * | 9/2003 | Ikeda | 417/410.1 |
| 6,699,078 B2 * | 3/2004 | Quadir | 439/693 |
| 7,056,104 B2 * | 6/2006 | Kimura et al. | 417/410.1 |
| 2003/0156954 A1 * | 8/2003 | Kimura et al. | 417/410.5 |
| 2003/0200761 A1 * | 10/2003 | Funahashi et al. | 62/228.4 |
| 2005/0223727 A1 | 10/2005 | Funahashi et al. | |
| 2006/0064998 A1 * | 3/2006 | Funahashi et al. | 62/228.4 |
| 2007/0115707 A1 * | 5/2007 | Koide | 363/146 |
| 2008/0205107 A1 | 8/2008 | Hattori et al. | |
| 2009/0087322 A1 | 4/2009 | Toyama et al. | |
| 2009/0315417 A1 * | 12/2009 | Taguchi et al. | 310/71 |
| 2010/0172770 A1 | 7/2010 | Ichise et al. | |
| 2010/0181877 A1 | 7/2010 | Watanabe et al. | |

FOREIGN PATENT DOCUMENTS

| | | |
|---|---|---|
| JP | 2003-120532 A | 4/2003 |
| JP | 2003-153552 A | 5/2003 |
| JP | 2003-324903 A | 11/2003 |
| JP | 2006-233820 A | 9/2006 |
| JP | 2006-316755 A | 11/2006 |
| JP | 2008-215089 A | 9/2008 |
| JP | 2009-089525 A | 4/2009 |
| JP | 2009-097503 A | 5/2009 |
| JP | 2009-114958 A | 5/2009 |
| JP | 2009-114961 A | 5/2009 |
| WO | WO 2008007534 A1 * | 1/2008 |

OTHER PUBLICATIONS

Japanese Decision to Grant a Patent dated Jun. 17, 2014, issued in corresponding Japanese Patent Application No. 2009-219175 (3 pages), Statement of Relevancey "The Decision to Grant a Patent has been received.".

* cited by examiner

INVERTER-INTEGRATED ELECTRIC COMPRESSOR

TECHNICAL FIELD

The present invention relates to an inverter-integrated electric compressor in which an inverter box, in which an inverter device is integrally mounted, is provided on an outer periphery of a housing accommodating a compressor and a motor.

BACKGROUND ART

An inverter-integrated electric compressor is used as a compressor for an air conditioner installed in an electric car or a hybrid car. The inverter-integrated electric compressor has a configuration in which an inverter box, in which an inverter device that converts direct-current power from a power source into alternating-current power and applies it to the motor is mounted, is provided on an outer periphery of a housing accommodating a compressor and a motor. The rotational speed is variably controlled according to control signals transmitted from a vehicle-side control device (ECU).

The inverter device is formed of an inverter circuit, which is composed of power devices, such as power semiconductor devices (for example, IGBTs), that convert direct-current power into alternating-current power and apply it to a motor, and a control board, on which is mounted a control circuit including a microcomputer that controls alternating-current power to be applied to the motor according to the control signals from the ECU; and a noise-removing filter circuit, which is provided in a wiring path for supplying direct-current power to the power device. This noise-removing filter circuit is typically composed of high-voltage components, such as a head capacitor (smoothing capacitor), an inductor coil, a common mode coil, and the like.

Furthermore, there is a known inverter-integrated electric compressor in which an intelligent power module (Intelligent Power Module; IPM), in which a driving circuit (gate driver) and a self-protection function are integrally mounted, is used as a power-controlling power device constituting an inverter circuit (for example, see PTLs 1 and 2).

CITATION LIST

Patent Literature

{PTL 1} Japanese Unexamined Patent Application, Publication No. 2003-153552 (see FIGS. 1 to 3)
{PTL 2} Japanese Unexamined Patent Application, Publication No. 2009-97503 (see FIGS. 1 to 4)

SUMMARY OF INVENTION

Technical Problem

However, PTLs 1 and 2 do not disclose the optimum layout for the case where an IPM is mounted as a power device. In general, an IPM has a configuration in which UVW output terminals that output converted alternating-current power to a motor side and PN input terminals that input direct-current power from a power source side are disposed together on one side, and in which connecting terminals connected to the microcomputer are disposed together on the other side. Although how a high-voltage wiring path and a low-voltage wiring path are laid out with respect to such an IPM determines the lengths of the wiring paths and the simplification of the wiring lines, and hence, exerts an influence on the control precision and problems such as noise interference, these points have not been adequately considered in the related art.

The present invention has been made in view of the above-described circumstances, and an object thereof is to provide an inverter-integrated electric compressor in which a wiring path connected to an intelligent power module (IPM) is arranged in the optimum layout to simplify the wiring path, and in which noise interference due to disturbances can be suppressed to improve the controllability.

Solution to Problem

To solve the above-described problems, an inverter-integrated electric compressor of the present invention employs the following solutions.

Specifically, an inverter-integrated electric compressor according to an aspect of the present invention is an inverter-integrated electric compressor in which an inverter box is provided on an outer periphery of a housing accommodating a compressor and a motor, the inverter box integrally accommodating an inverter device. The inverter device includes an intelligent power module constituting an inverter circuit, and UVW output terminals arranged on one side of the intelligent power module are disposed so as to face, in the inverter box, a glass-sealed terminal that applies power from the inverter device to the motor.

The above-described inverter-integrated electric compressor according to one aspect of the present invention has a layout in which the inverter device includes an intelligent power module (Intelligent Power Module; IPM) constituting an inverter circuit and in which UVW output terminals arranged on one side of the intelligent power module are disposed so as to face, in the inverter box, a glass-sealed terminal that applies power from the inverter device to the motor. Therefore, the length of the wiring path for supplying power and detecting current, which connects the IPM and the motor, can be reduced as much as possible. Accordingly, the wiring path between the IPM and the motor can be simplified. Furthermore, it is possible to minimize the circuit resistance therebetween, thereby increasing the current-detection precision, and it is possible to reduce the influence of the noise interference due to disturbance, thereby improving the controllability and reliability of the inverter device.

In the above-described inverter-integrated electric compressor according to one aspect of the present invention, the glass-sealed terminal may be disposed in the inverter box, at a rear end of the housing accommodating the motor, and the intelligent power module may be disposed such that the UVW output terminals thereof face a front portion of the glass-sealed terminal.

In this configuration, the glass-sealed terminal is disposed in the inverter box, at a rear end of the housing accommodating the motor, and the intelligent power module is disposed such that the UVW output terminals thereof face a front portion of the glass-sealed terminal. Therefore, in a layout in which the glass-sealed terminal is disposed at the rear end of the housing, by disposing the IPM such that the UVW output terminals thereof face the front portion, it is possible to dispose the glass-sealed terminal and the UVW output terminals of the IPM so as to face each other. Accordingly, also with this configuration, it is possible to reduce the length of the high-voltage wiring path between the IPM and the motor, thereby simplifying the wiring path between the IPM and the motor, and it is possible to increase the current-detection precision and reduce the influence of the noise interference due to disturbance, thereby improving the controllability and reliability of the inverter device.

In the above-described inverter-integrated electric compressor according to one aspect of the present invention, the glass-sealed terminal may be disposed in the inverter box, on the housing accommodating the motor, at a position corresponding to the front end of the motor, and the intelligent power module may be disposed such that the UVW output terminals thereof face a rear portion of the glass-sealed terminal.

In this configuration, the glass-sealed terminal is disposed in the inverter box, on the housing accommodating the motor, at a position corresponding to the front end of the motor, and the intelligent power module (IPM) is disposed such that the UVW output terminals thereof face a rear portion of the glass-sealed terminal. Therefore, in a layout in which the glass-sealed terminal is disposed in the housing, at a position corresponding to the front end of the motor, by disposing the IPM such that the UVW output terminals thereof face the rear portion, it is possible to dispose the glass-sealed terminal and the UVW output terminals of the IPM so as to face each other. Accordingly, also with this configuration, it is possible to reduce the length of the high-voltage wiring path between the IPM and the motor, thereby simplifying the wiring path between the IPM and the motor, and it is possible to increase the current-detection precision and reduce the influence of the noise interference due to disturbance, thereby improving the controllability and reliability of the inverter device.

In the above-described inverter-integrated electric compressor according to one aspect of the present invention, the glass-sealed terminal may be disposed in the inverter box, at a side of the housing accommodating the motor, and the intelligent power module may be disposed such that the UVW output terminals thereof are arranged along and inward of the glass-sealed terminal so as to face thereto.

In this configuration, the glass-sealed terminal is disposed in the inverter box, at the side of the housing accommodating the motor, and the intelligent power module (IPM) is disposed such that the UVW output terminals thereof are arranged along and inward of the glass-sealed terminal so as to face thereto. Therefore, in a layout in which the glass-sealed terminal is disposed at the side of the housing, by disposing the IPM such that the UVW output terminals thereof face inward thereof, it is possible to dispose the glass-sealed terminal and the UVW output terminals of the IPM so as to face each other. Accordingly, also with this configuration, it is possible to reduce the length of the high-voltage wiring path between the IPM and the motor, thereby simplifying the wiring path between the IPM and the motor, and it is possible to increase the current-detection precision and reduce the influence of the noise interference due to disturbance, thereby improving the controllability and reliability of the inverter device.

In any one of the above-described inverter-integrated electric compressors, the intelligent power module may include PN input terminals that are arranged in the same row as the UVW output terminals, and a PN terminal to which a high-voltage cable from a power source is connected may be disposed at a position facing the PN input terminals.

In this configuration, the intelligent power module (IPM) includes PN input terminals that are arranged in the same row as the UVW output terminals, and a PN terminal to which a high-voltage cable from a power source is connected is disposed at a position facing the PN input terminals. Therefore, the length of the high-voltage wiring path connecting the PN input terminals of the IPM and the PN terminal to which the high-voltage cable is connected can be reduced as much as possible. Accordingly, it is possible to simplify the wiring path therebetween, thereby improving the ease of routing thereof.

In the above-described inverter-integrated electric compressor, a filter circuit component of the inverter device may be connected to a wiring path between the PN input terminals of the intelligent power module and the PN terminal to which the high-voltage cable is connected.

In this configuration, a filter circuit component of the inverter device is connected to a wiring path between the PN input terminals of the intelligent power module (IPM) and the PN terminal to which the high-voltage cable is connected. Therefore, the length of the wiring path connecting high-voltage components, such as a head capacitor, an inductor coil, and a common mode coil, constituting the noise-removing filter circuit can be reduced as much as possible. Accordingly, it is possible to simplify the wiring path therebetween, thereby improving the ease of routing thereof, and it is possible to reduce the circuit resistance therebetween, thereby reducing an inductance component and improving the filtering performance.

In any one of the above-described inverter-integrated electric compressors, the UVW output terminals and the PN input terminals may be arranged on one side of the intelligent power module, and the glass-sealed terminal and the PN terminal to which the high-voltage cable is connected may be disposed on the same side so as to face the UVW output terminals and the PN input terminals.

In this configuration, the UVW output terminals and the PN input terminals are arranged on one side of the intelligent power module (IPM), and the glass-sealed terminal and the PN terminal to which the high-voltage cable is connected are disposed on the same side so as to face the UVW output terminals and the PN input terminals. Therefore, the high-voltage wiring paths can be disposed on one side of the IPM where the UVW output terminals and the PN input terminals are arranged. Accordingly, it is possible to reduce the length of the high-voltage wiring path as much as possible, thereby simplifying the wiring path, and it is possible to reduce the influence of the noise interference due to disturbance, thereby improving the controllability and reliability of the inverter device.

In any one of the above-described inverter-integrated electric compressors, the intelligent power module may be disposed such that the side provided with the UVW output terminals and the PN input terminals is oriented toward a coolant intake port provided at the rear end of the housing, and high-voltage circuit components including the intelligent power module may be disposed near the coolant intake port.

In this configuration, the intelligent power module (IPM) is disposed such that the side provided with the UVW output terminals and the PN input terminals is oriented toward a coolant intake port provided at the rear end of the housing, and high-voltage circuit components including the intelligent power module are disposed near the coolant intake port. Therefore, high-voltage circuit components including the IPM can be cooled by low-temperature, low-pressure coolant gas taken into the motor housing from the coolant intake port. Accordingly, it is possible to efficiently cool the heat-generating components of the inverter device, thereby improving the cooling performance.

In any one of the above-described inverter-integrated electric compressors, microcomputer connecting terminals to be connected to a microcomputer may be arranged on the intelligent power module, on a side opposite to the side provided with the UVW output terminals, and the microcomputer may be mounted on a control board of the inverter device, near the microcomputer connecting terminals, so as to face thereto.

In this configuration, microcomputer connecting terminals to be connected to a microcomputer are arranged on the intelligent power module (IPM), on a side opposite to the side provided with the UVW output terminals, and the microcomputer is mounted on a control board of the inverter device, near the microcomputer connecting terminals, so as to face thereto. Therefore, the length of the wiring path between the IPM and the microcomputer on the control board can be reduced as much as possible, and the low-voltage wiring path and the high-voltage wiring path on the control board can be separated at the left side and the right side of the IPM. Accordingly, it is possible to suppress the mutual noise interference and prevent malfunction of the inverter device.

In the above-described inverter-integrated electric compressor, the control board may be disposed above the intelligent power module.

In this configuration, because the control board is disposed above the intelligent power module (IPM), the flat surface area can be reduced. Thus, it is possible to reduce the size (the flat surface area) of the inverter box, in which the inverter device is accommodated and integrally mounted. Accordingly, the inverter-integrated electric compressor can be reduced in size.

In the above-described inverter-integrated electric compressor, the filter circuit component may be provided in a junction box that is mounted to the rear end of the housing.

In this configuration, because the filter circuit component is disposed in the junction box that is mounted to the rear end of the housing, it is possible to install high-voltage components, such as the head capacitor, the inductor coil, and the common mode coil, constituting the filter circuit in the junction box and to integrally mount them to the housing. Accordingly, it is possible to improve the ease of assembly of the inverter device, the layout flexibility, and the adaptability to a change in specification, while achieving a reduction in size. Furthermore, noise transmission from the filter circuit components to the inverter circuit can be reduced, thereby suppressing malfunction or the like due to noise interference. Note that this layout is particularly advantageous when the intelligent power module (IPM) is disposed such that the UVW output terminals thereof are oriented toward the rear end of the housing.

In the above-described inverter-integrated electric compressor, the filter circuit component may be provided in a junction box mounted to a side surface of the housing.

In this configuration, because the filter circuit component is provided in the junction box that is mounted to a side surface of the housing, it is possible to install high-voltage components, such as the head capacitor, the inductor coil, and the common mode coil, constituting the filter circuit in the junction box, and to integrally mount them to the housing. Accordingly, it is possible to improve the ease of assembly of the inverter device, the layout flexibility, and the adaptability to a change in specification, while achieving a reduction in size. Furthermore, noise transmission from the filter circuit component to the inverter circuit can be reduced, thereby suppressing malfunction or the like due to noise interference. Note that this layout is particularly advantageous when the intelligent power module (IPM) is disposed such that the UVW output terminals thereof are oriented toward the side surface of the housing.

In the above-described inverter-integrated electric compressor, the filter circuit component may be provided in a junction box that also serves as a cover and is provided on a top surface of the inverter box.

In this configuration, because the filter circuit component is provided in the junction box that also serves as a cover and is provided on a top surface of the inverter box, it is possible to install high-voltage components, such as the head capacitor, the inductor coil, and the common mode coil, constituting the filter circuit in the junction box, which also serves as the cover, and to integrally mount them to the housing. Accordingly, it is possible to improve the ease of assembly of the inverter device, the layout flexibility, and the adaptability to a change in specification, while achieving a reduction in size. Furthermore, noise transmission from the filter circuit components to the inverter circuit can be reduced, thereby suppressing malfunction or the like due to noise interference.

In any one of the above-described inverter-integrated electric compressors, a wiring path including the filter circuit component provided in the junction box may be connected to the intelligent power module via a harness that has plug-in terminals.

In this configuration, because the wiring path including the filter circuit component provided in the junction box is connected to the intelligent power module (IPM) via a harness that has plug-in terminals, it is possible to connect the wiring path including the filter circuit component provided in the junction box to the IPM via the harness that has direct-mount terminals called plug-in terminals. Accordingly, the wiring path can be simplified, reduced in size and cost, and improving in the ease of wiring. Note that, because electric cars have small vibration and a low temperature compared with engine vehicles, the use of the plug-in terminals does not cause trouble, such as detachment of the wiring lines. Thus, sufficient reliability can be ensured.

In any one of the above-described inverter-integrated electric compressors, the intelligent power module and the control board may be mounted on a metal base plate and may be secured to a wall of the housing via the base plate in the inverter box.

In this configuration, the intelligent power module (IPM) and the control board are mounted on a metal base plate and are secured to a wall of the housing via the base plate in the inverter box. Therefore, the heat-generating components, such as the power semiconductor devices, of the IPM can be cooled by coolant, via the housing wall, by the metal base plate made of aluminum or the like, serving as a heat sink. Accordingly, it is possible to efficiently cool the heat-generating components of the inverter device, thereby improving the cooling performance.

Advantageous Effects of Invention

With the present invention, the length of the wiring path for supplying power and detecting current, which connects the IPM and the motor, can be reduced as much as possible. Accordingly, the wiring path between the IPM and the motor can be simplified. Furthermore, it is possible to minimize the circuit resistance therebetween, thereby increasing the current-detection precision, and it is possible to reduce the influence of the noise interference due to disturbance, thereby improving the controllability and reliability of the inverter device.

DESCRIPTION OF EMBODIMENTS

Embodiments of the present invention will be described below with reference to the drawings.
{First Embodiment}
A first embodiment of the present invention will be described below with reference to FIGS. 1 to 3.

Figure 1:
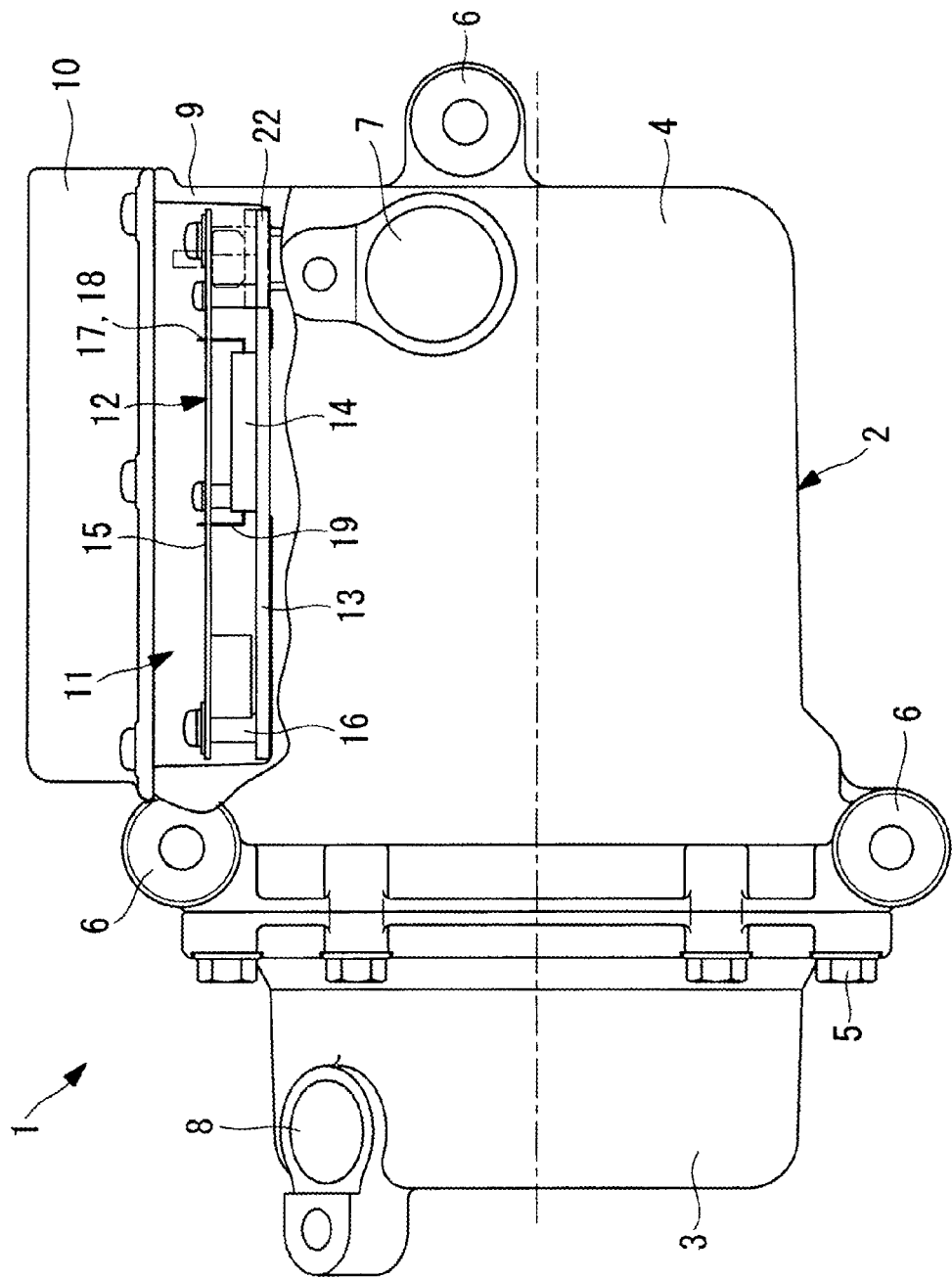
FIG. 1 is a partially cutaway side view of an inverter-integrated electric compressor according to a first embodiment of the present invention.
Figure 2A:
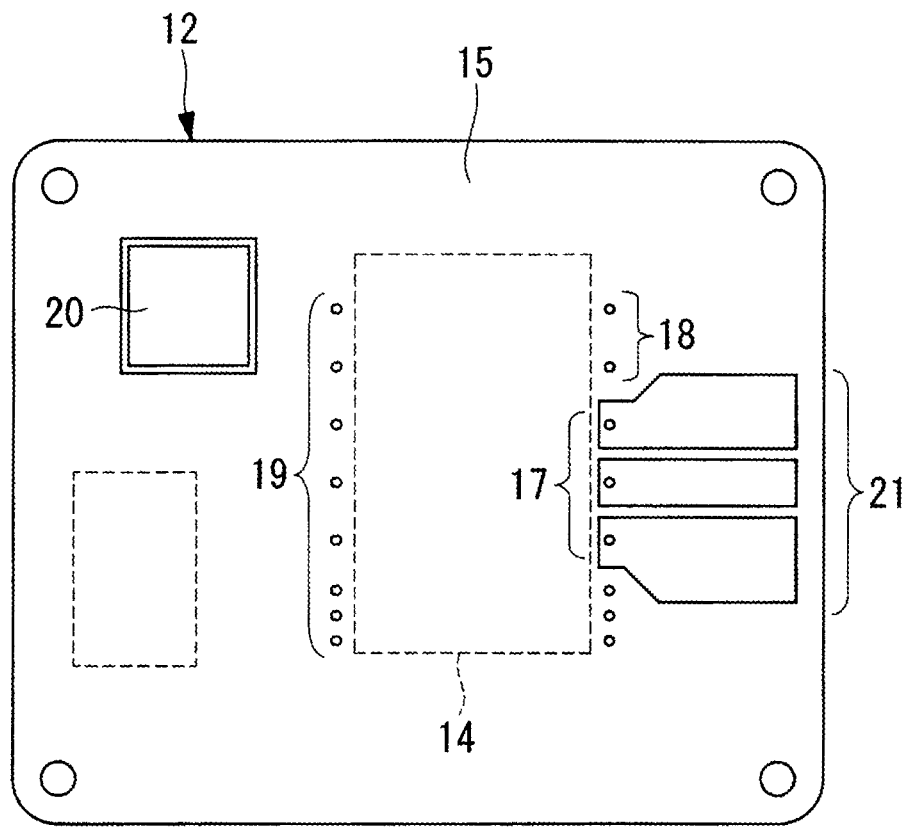
FIG. 2A is a plan view of an inverter module mounted in the inverter-integrated electric compressor shown in FIG. 1.
Figure 2B:
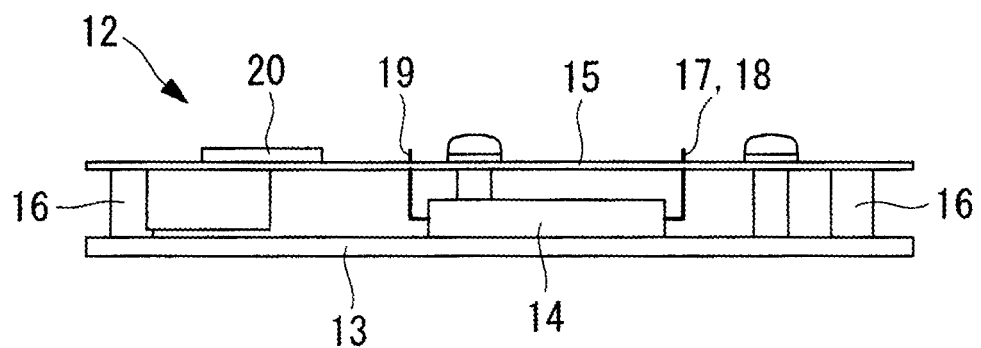
FIG. 2B is a side view of an inverter module mounted in the inverter-integrated electric compressor shown in FIG. 1.
Figure 3:
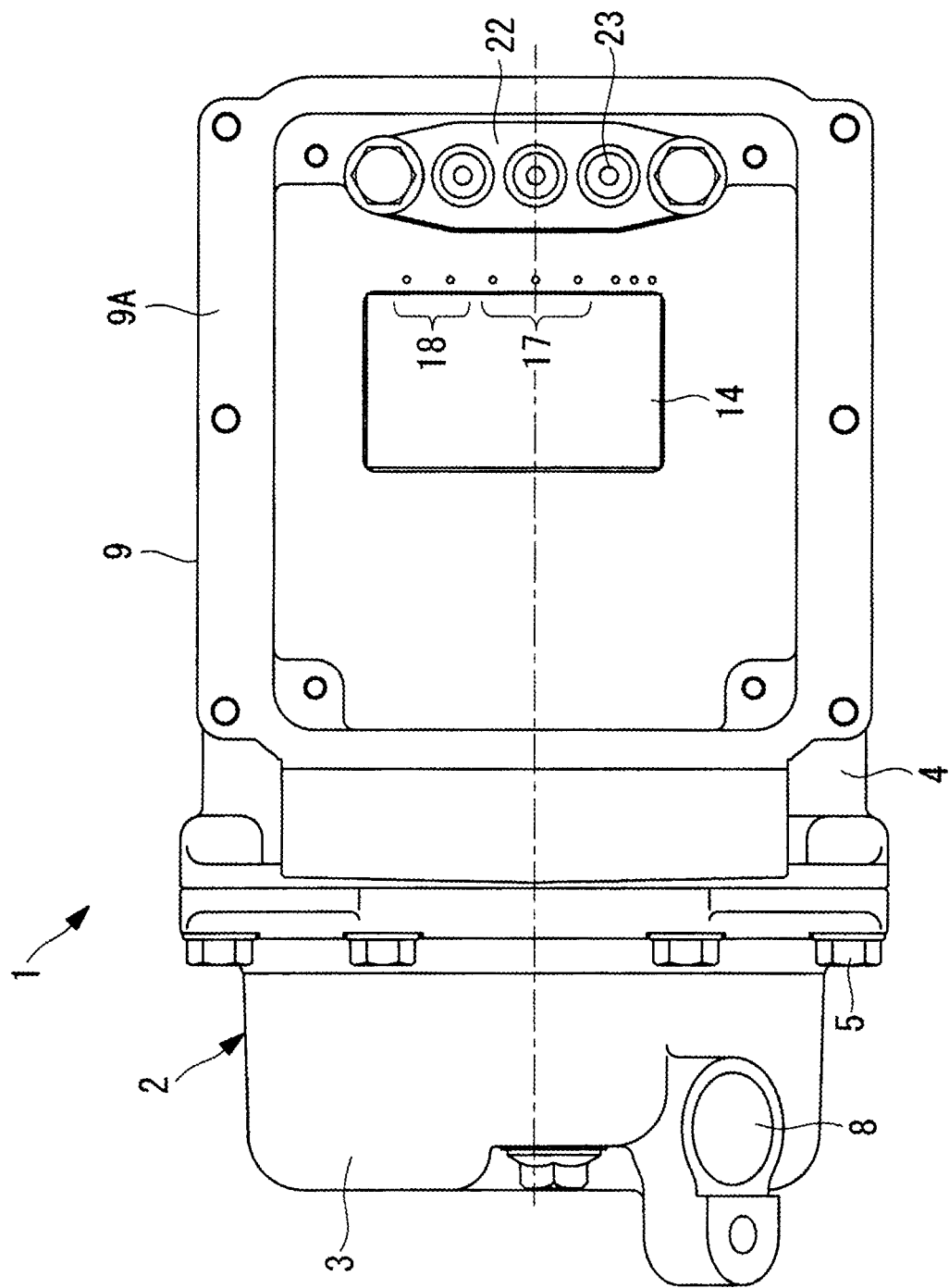
FIG. 3 is a schematic plan view of the inverter-integrated electric compressor shown in FIG. 1, showing a state in which some components are removed.

FIG. 1 is a partially cutaway side view of an inverter-integrated electric compressor according to a first embodiment of the present invention, FIG. 2A is a plan view of an inverter module mounted therein, FIG. 2B is a side view of (B) thereof, and FIG. 3 is a schematic plan view of the inverter-integrated electric compressor, showing a state in which some components are removed. An inverter-integrated electric compressor 1 includes a compressor (not shown) and a housing 2 accommodating a motor.

The housing 2 is formed of a compressor housing 3 accommodating the compressor, and a motor housing 4 accommodating the motor, the housings 3 and 4 being aluminum die-castings and integrated into a single component with bolts 5. The housing 2 has integrally formed legs 6 for mounting the compressor at a plurality of positions (in this embodiment, three positions) on the outer periphery; a coolant intake port 7 for taking in low-pressure coolant gas at the rear end (the right end in FIG. 1) of the motor housing 4; and a coolant discharge port 8 for discharging compressed coolant gas at the front end (the left end in FIG. 1) of the compressor housing 3.

Furthermore, an inverter box 9 in which the inverter device 11 is integrally mounted is formed integrally with the outer periphery of the housing 2 (the outer periphery on the motor housing 4 side). The inverter box 9 is configured such that the top surface is sealed by a cover 10 after the inverter device 11 is accommodated therein. This inverter box 9 has a substantially rectangular shape in plan view, the periphery thereof being formed of an upright wall extending upward, the top surface thereof serving as a flange surface 9A to which the cover 10 is fixed, and the bottom surface thereof being formed of an outer peripheral wall of the housing, which is a flat surface on which the inverter device 11 is installed.

As shown in FIG. 2, the inverter device 11 accommodated in the inverter box 9 includes an inverter module (inverter circuit) 12, which is composed of a metal base plate 13 for mounting, an intelligent power module (Intelligent Power Module; hereinbelow, IPM) 14, and a control board 15, which are integrated with spacers 16 therebetween. The metal base plate 13 is made of a rectangular aluminum alloy plate and is securely fastened to the bottom surface in the inverter box 9, i.e., the outer peripheral wall of the motor housing 4, which is a flat surface, with bolts and the like so as to be in close contact therewith.

The IPM 14, serving as a power-controlling power device constituting the inverter circuit, is a module in which a driving circuit (gate driver) and a self-protection function are mounted integrally with a switching circuit composed of a plurality of power semiconductor devices, such as IGBTs, and is mounted (screwed) to the metal base plate 13 with an insulating member or the like therebetween. The IPM 14 is a rectangular module and has a configuration in which UVW output terminals 17 that output converted alternating-current power to the motor side and PM input terminals 18 that input direct-current power from the power source side are disposed together on one side in the longitudinal direction, and microcomputer connecting terminals 19 connected to the microcomputer 20 mounted on the control board 15 are disposed together in a row on the opposite side.

The control board 15 is a rectangular substrate on which is mounted a control circuit including the microcomputer 20 that receives control signals from the vehicle-side control device (ECU) and controls alternating-current power to be applied to the motor according to the signals. The microcomputer 20 mounted on the control board 15 is disposed so as to face the IPM 14, near the side where the microcomputer connecting terminals 19 are arranged. Furthermore, the control board 15 is integrated with the metal base plate 13 with the plurality of spacers 16 therebetween, forming the inverter module 12 having a two-layer structure.

The UVW output terminals 17 of the IPM 14 penetrate through through-holes in the control board 15 and are soldered to a pattern 21 on the control board 15. Similarly, the PN input terminals 18 penetrate through through-holes in the control board 15 and are soldered to a pattern (not shown), thereby being connected to a PN terminal, to which a high-voltage cable from a high-voltage power source is connected, through a high-voltage wiring path. In addition, the microcomputer connecting terminals 19 penetrate through through-holes in the control board 15 and are soldered to a pattern (not shown), thereby being connected to the microcomputer 20 and forming a low-voltage wiring path connected to the ECU.

The alternating-current power converted by the inverter device 11 is applied to the motor accommodated in the motor housing 4, via a glass-sealed terminal 22. As shown in FIGS. 1 and 3, the glass-sealed terminal 22 is disposed in the inverter box 9, at the rear end thereof, so as to penetrate through the motor housing 4 and, in the motor housing 4, is connected to the motor via a harness.

As shown in FIG. 3, UVW terminals 23 of the glass-sealed terminal 22 are disposed so as to face the UVW output terminals 17 of the IPM 14 disposed so as to face the front side of the glass-sealed terminal 22, and are connected to the pattern 21 on the control board 15 connected to the UVW output terminals 17 by soldering or welding, forming a high-voltage wiring path.

With the above-described configuration, this embodiment provides the following advantages.

Direct-current power supplied from the high-voltage power source to the inverter device 11 through the high-voltage cable is input to the PN input terminals 18 of the inverter module (inverter circuit) 12 via the PN terminal and the high-voltage wiring path. This direct-current power is converted into alternating-current power having a predetermined frequency by the IPM 14, according to the control signals from the ECU, and is then applied from the UVW output terminals 17 to the motor via the UVW terminals 23 of the glass-sealed terminal 22.

Accordingly, the motor is driven, and the compressor connected to the rotation shaft of the motor is rotationally driven. By driving the compressor, low-pressure coolant gas is taken into the housing 2 from the coolant intake port 7. This coolant gas is circulated around the motor in the motor housing 4 toward the compressor housing 3 and is then taken into the compressor. During this process, heat-generating components, such as the power semiconductor devices (IGBTs), of the IPM 14 constituting the inverter module 12 are cooled, via coolant gas, by the metal base plate 13, which is made of an aluminum alloy plate and is in close contact with the outer peripheral wall of the motor housing 4, as a heat sink.

The high-pressure coolant gas compressed by the compressor is discharged into the compressor housing 3 and is sent to a refrigeration cycle side via the coolant discharge port 8. In this inverter-integrated electric compressor 1, the IPM 14 constituting the inverter device 11 is disposed so as to face the glass-sealed terminal 22 disposed in the inverter box 9, at the rear end of the motor housing 4 accommodating the motor, and has a layout in which the UVW output terminals 17 arranged on one side of the IPM 14 are disposed so as to face the UVW terminals 23 of the glass-sealed terminal 22. In addition, the UVW output terminals 17 and the UVW terminals 23 are connected via the pattern 21 constituting the high-voltage wiring path on the control board 15.

Thus, the length of the wiring path for supplying power and detecting current, connecting the IPM 14 and the motor, can be reduced as much as possible, and hence, the wiring path between the IPM 14 and the motor can be simplified. Furthermore, it is possible to minimize the circuit resistance therebetween, thereby increasing the current-detection precision, and it is possible to reduce the influence of the noise interference due to disturbances, thereby improving the controllability and reliability of the inverter device 11.

Furthermore, the IPM 14 is configured such that the connecting terminals 19 connected to the microcomputer 20 mounted on the control board 15 are arranged on the opposite side to the UVW output terminals 17 and the PN input terminals 18, and such that the microcomputer 20 mounted on the control board 15 is disposed so as to face the IPM 14, near the microcomputer connecting terminals 19. Therefore, the length of the wiring path between the IPM 14 and the microcomputer 20 on the control board 15 can be reduced as much as possible, and the low-voltage wiring path and the high-voltage wiring path on the control board 15 can be separated at the left side and the right side of the IPM 14. Accordingly, it is possible to suppress mutual noise interference and prevent malfunction of the inverter device 11.

Furthermore, because the control board 15 is disposed above the IPM 14 and is integrated therewith, forming the inverter module 12 having a two-layer structure, the flat surface area can be reduced. Thus, it is possible to reduce the size (the flat surface area) of the inverter box 9, in which the inverter device 11 is accommodated and integrally mounted. In this way, the inverter-integrated electric compressor 1 can be reduced in size.

Furthermore, the IPM 14 and the control board 15 are mounted to the metal base plate 13 made of an aluminum alloy plate and are secured to the wall surface, in the inverter box 9, of the motor housing 4, via this metal base plate 13. Therefore, the heat-generating components, such as power semiconductor devices, of the IPM 14 can be cooled by coolant, via the motor housing wall, by the metal base plate 13, serving as a heat sink. Accordingly, it is possible to efficiently cool the heat-generating components of the inverter device 11, thereby improving the cooling performance.

{Second Embodiment}

Next, a second embodiment of the present invention will be described using FIG. 4.

This embodiment is different from the above-described first embodiment in the position where a glass-sealed terminal 22A is disposed. Because the other configurations are the same as those according to the first embodiment, descriptions thereof will be omitted.

Figure 4:
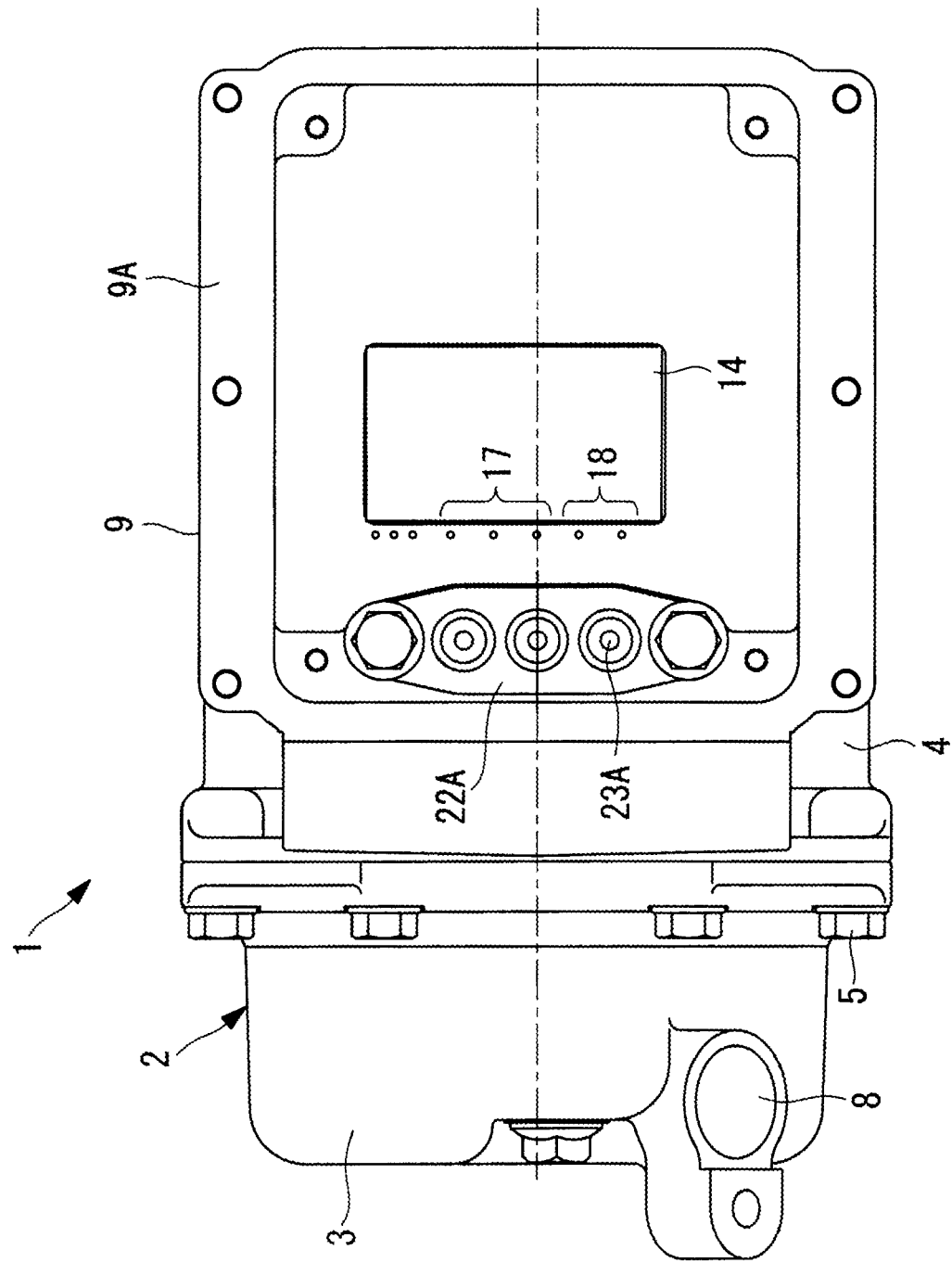
FIG. 4 is a plan view of an inverter-integrated electric compressor according to a second embodiment of the present invention, showing a state in which some components are removed.

As shown in FIG. 4, this embodiment has a configuration in which the glass-sealed terminal 22A that applies alternating-current power to the motor is disposed in the inverter box 9, at the front end of the motor housing 4 accommodating the motor, and in which the IPM 14 is disposed such that the UVW output terminals 17 thereof face the rear portion of the glass-sealed terminal 22A.

In this manner, the glass-sealed terminal 22A is disposed in the inverter box 9, at the front end of the motor housing 4, in other words, at a position corresponding to the front end of the motor accommodated in the housing 2, and the IPM 14 is disposed such that the UVW output terminals 17 thereof face the rear portion of this glass-sealed terminal 22A. Therefore, even in a layout in which the glass-sealed terminal 22A is disposed at the front end of the motor housing 4, by disposing the IPM 14 such that the UVW output terminals 17 face the rear portion thereof, it is possible to dispose the UVW terminals 23A of the glass-sealed terminal 22A and the UVW output terminals 17 of the IPM 14 so as to face each other.

Accordingly, also in this embodiment, similarly to the first embodiment, it is possible to reduce the length of the high-voltage wiring path connecting the IPM 14 and the motor, thereby simplifying the wiring path between the IPM 14 and the motor, and it is possible to increase the current-detection precision and reduce the influence of the noise interference due to disturbances, thereby improving the controllability and reliability of the inverter device 11.

{Third Embodiment}

Next, a third embodiment of the present invention will be described using FIG. 5.

This embodiment is different from the above-described first and second embodiments in the position where a glass-sealed terminal 22B is disposed. Because the other configurations are the same as those according to the first and second embodiments, descriptions thereof will be omitted.

Figure 5:
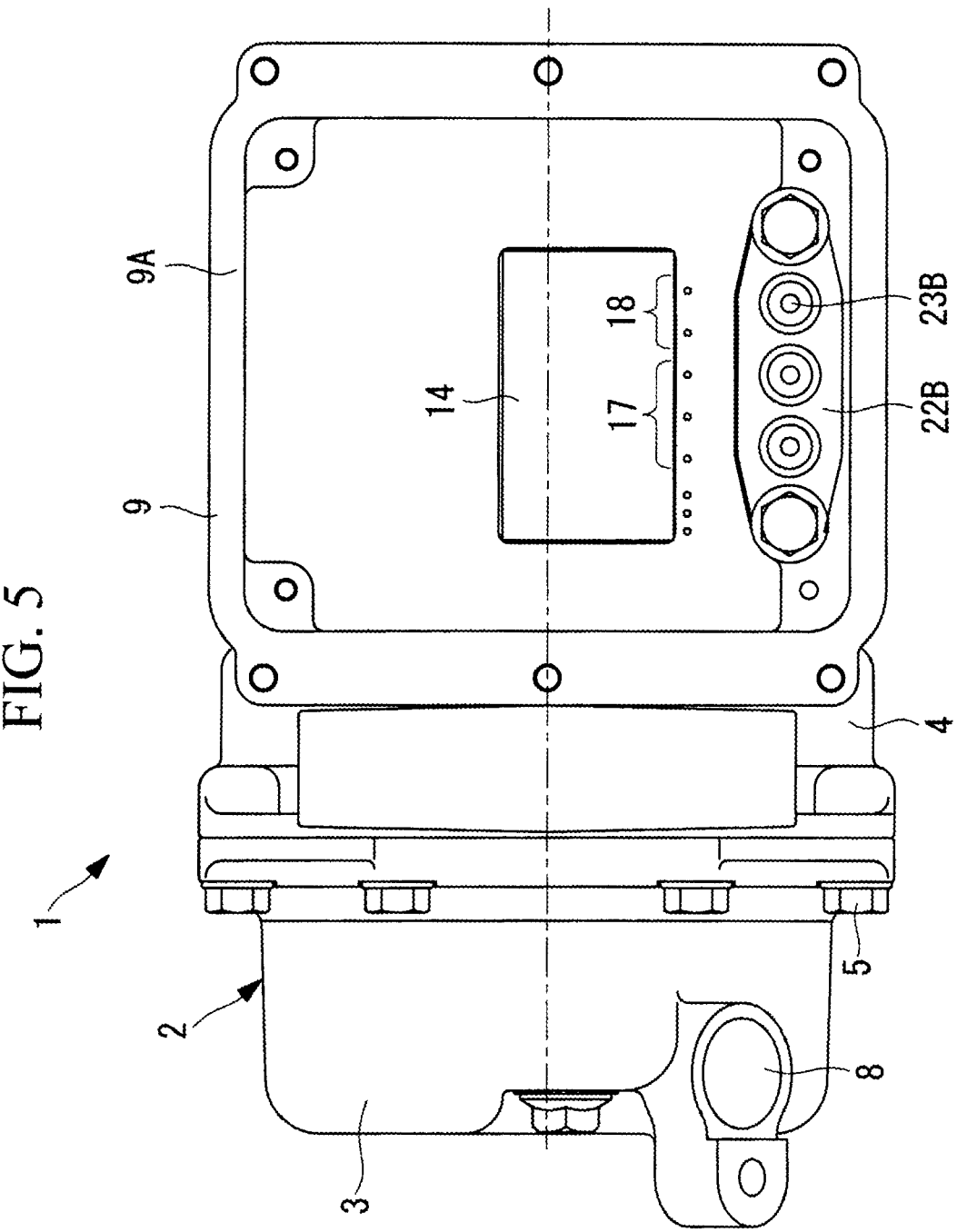
FIG. 5 is a plan view of an inverter-integrated electric compressor according to a third embodiment of the present invention, showing a state in which some components are removed.

As shown in FIG. 5, this embodiment has a configuration in which the glass-sealed terminal 22B that applies alternating-current power to the motor is disposed in the inverter box 9, at the side of the motor housing 4 accommodating the motor, and in which the IPM 14 is disposed such that the UVW output terminals 17 thereof are arranged along and inward of the glass-sealed terminal 22B so as to face thereto.

In this manner, the glass-sealed terminal 22B is disposed in the inverter box 9, at the side of the motor housing 4, and the IPM 14 is disposed such that the UVW output terminals 17 thereof are arranged along and inward of the glass-sealed terminal 22B so as to face thereto. Therefore, even in a layout in which the glass-sealed terminal 22B is disposed at the side of the motor housing 4, by disposing the IPM 14 such that the UVW output terminals 17 thereof are arranged on the inside of the glass-sealed terminal 22B so as to face thereto, it is possible to dispose the UVW terminals 23B of the glass-sealed terminal 22B and the UVW output terminals 17 of the IPM 14 so as to face each other.

Accordingly, also in this embodiment, similarly to the above-described first and second embodiments, it is possible to reduce the length of the high-voltage wiring path connecting the IPM 14 and the motor, thereby simplifying the wiring path between the IPM 14 and the motor, and it is possible to increase the current-detection precision and reduce the influence of the noise interference due to disturbances, thereby improving the controllability and reliability of the inverter device 11.

{Fourth Embodiment}

Next, a fourth embodiment of the present invention will be described using FIG. 6.

This embodiment is different from the above-described first embodiment in that a junction box 25 accommodating noise-removing filter circuit components is provided. Because the other configurations are the same as those according to the first embodiment, descriptions thereof will be omitted.

Figure 6:
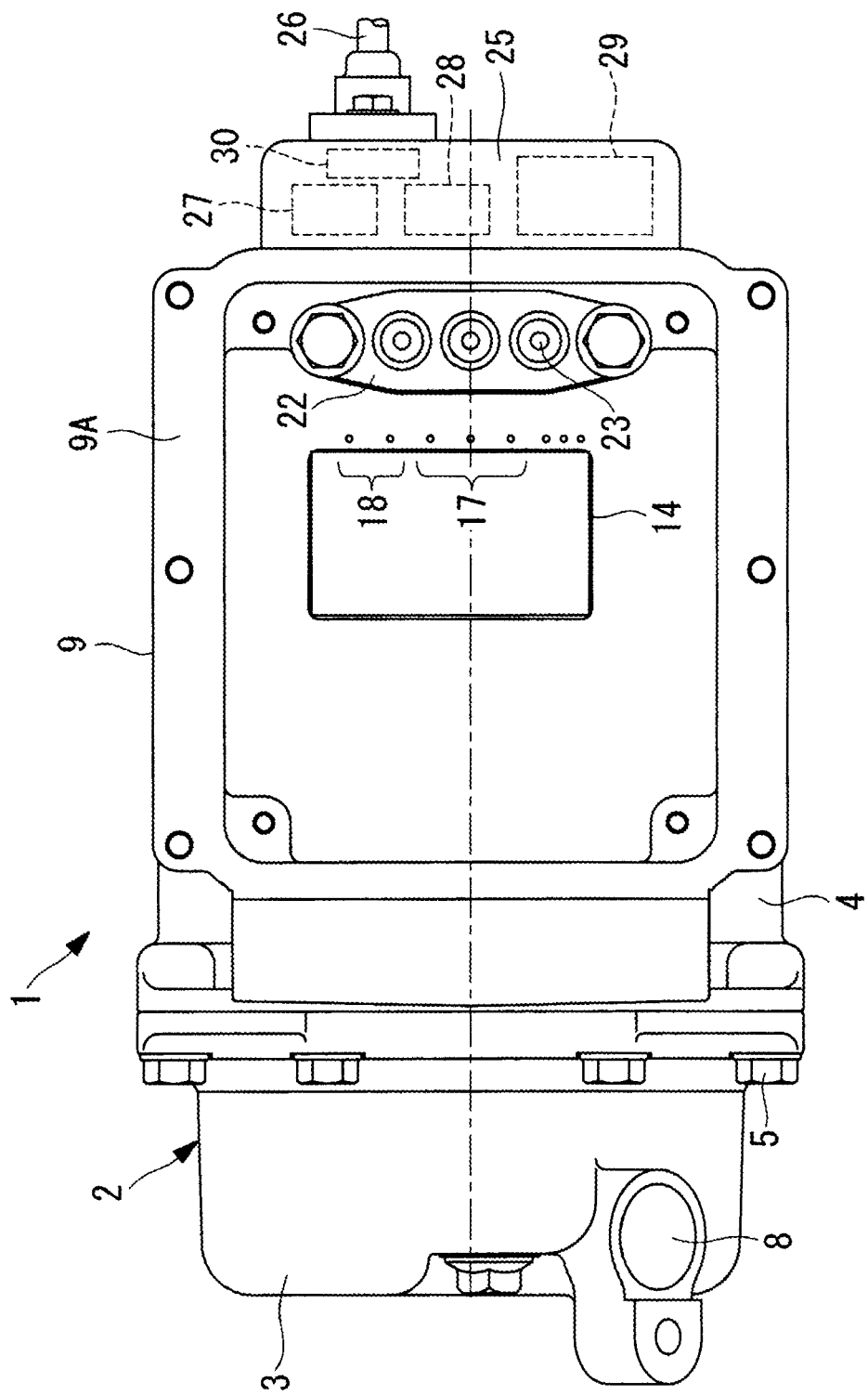
FIG. 6 is a plan view of an inverter-integrated electric compressor according to a fourth embodiment of the present invention, showing a state in which some components are removed.

As shown in FIG. 6, this embodiment has a configuration in which the junction box 25 is mounted to the rear end (the right end in FIG. 6) of the housing 2 (the motor housing 4), a high-voltage cable 26 from the power source being connected to the junction box 25, the junction box 25 accommodating noise-removing filter circuit components 27, 28, and 29 of the inverter device 11.

The high-voltage cable 26 is connected to a PN terminal 30 provided in the junction box 25. This PN terminal 30 is disposed at a position facing the PN input terminals 18, which are arranged in the same row as the UVW output terminals 17 on one side of the IPM 14, and is electrically connected to the PN input terminals 18 of the IPM 14 via the high-voltage wiring path and the pattern (not shown) on the control board 15.

It is configured such that high-voltage components, such as an inductor coil 27, a common mode coil 28, and a head capacitor (a smoothing capacitor) 29, constituting the noise-removing filter circuit of the inverter device 11 are connected to the high-voltage wiring path extending from the PN terminal 30 to the PN input terminals 18 of the IPM 14. These filter circuit components 27, 28, and 29 are accommodated in the junction box 25.

Furthermore, with a configuration in which the junction box 25, accommodating the PN terminal 30 and the noise-removing filter circuit components 27, 28, and 29, is mounted to the rear end of the motor housing 4, it is possible to achieve a configuration in which the high-voltage wiring path extending from the PN terminal 30, to which the high-voltage cable 26 is connected, to the PN input terminals 18 of the IPM 14 is disposed together with the high-voltage wiring path connecting the UVW output terminals 17 of the IPM 14 and the glass-sealed terminal 22, on one side of the IPM 14.

Furthermore, with the above-described configuration, it is possible to achieve a configuration in which the filter circuit components 27, 28, and 29 and high-voltage-path side components, including the IPM 14 having heat-generating components, such as the power semiconductor devices (IGBTs), are disposed, together, near the coolant intake port 7 provided at the rear end of the motor housing 4.

As has been described, in a layout in which the PN terminal 30, to which the high-voltage cable 26 from the power source is connected, is disposed at a position facing the PN input terminals 18, which are arranged in the same row as the UVW output terminals 17 on one side of the IPM 14, the length of the high-voltage wiring path extending between the PN terminal 30, to which the high-voltage cable 26 is connected, and the PN input terminals 18 of the IPM 14 can be reduced as much as possible. Thus, it is possible to simplify the wiring path extending between the PN terminal 30 and the PN input terminals 18, thereby improving the ease of routing thereof.

Furthermore, because a configuration in which the filter circuit components 27, 28, and 29 of the inverter device 11 are connected to the wiring path between the PN terminal 30, to which the high-voltage cable 26 is connected, and the PN input terminals 18 of the IPM 14 is used, the length of the wiring path connecting high-voltage components, such as the inductor coil 27, the common mode coil 28, and the head capacitor 29, constituting the noise-removing filter circuit can be reduced as much as possible. Accordingly, it is possible to simplify the wiring path therebetween, thereby improving the ease of routing thereof, and it is possible to reduce the circuit resistance therebetween, thereby reducing an inductance component and improving the filtering performance.

Furthermore, the glass-sealed terminal 22 and the PN terminal 30, to which the high-voltage cable 26 is connected, are disposed on the same side so as to face the UVW output terminals 17 and the PN input terminals 18 arranged on one side of the IPM 14. Therefore, the high-voltage wiring paths can be disposed on one side of the IPM 14 where the UVW output terminals 17 and the PN input terminals 18 are arranged. In this way, it is possible to reduce the length of the high-voltage wiring path as much as possible, thereby simplifying the wiring path, and it is possible to reduce the influence of the noise interference due to disturbance, thereby improving the controllability and reliability of the inverter device 11.

Furthermore, a configuration in which one side of the IPM 14 where the UVW output terminals 17 and the PN input terminals 18 are arranged is oriented toward the coolant intake port 7 provided at the rear end of the motor housing 4, and in which the high-voltage circuit components including the IPM 14 are disposed near the coolant intake port 7 is used. Therefore, the high-voltage circuit components including the IPM 14 can be cooled by low-temperature, low-pressure coolant gas taken into the motor housing 4 from the coolant intake port 7. Accordingly, it is possible to efficiently cool the heat-generating components of the inverter device 11, thereby improving the cooling performance.

Furthermore, because high-voltage components, such as the inductor coil 27, the common mode coil 28, and the head capacitor 29, constituting the noise-removing filter circuit are provided in the junction box 25 that is mounted to the rear end of the motor housing 4, the filter circuit components 27, 28, and 29 can be integrally mounted to the housing 2 (the motor housing 4). Accordingly, it is possible to improve the ease of assembly of the inverter device 11, the layout flexibility, and the adaptability to a change in specifications, while achieving a reduction in size. Furthermore, noise transmission from the filter circuit components 27, 28, and 29 to the inverter module (the inverter circuit) 12 can be reduced, thereby suppressing the occurrence of malfunctions or the like due to noise interference.

Note that, this embodiment has a configuration in which the junction box 25 accommodating the filter circuit components is mounted to the rear end (the right end in FIG. 6) of the housing 2 (the motor housing 4). However, as shown in FIG. 5, in a configuration in which one side of the IPM 14 where the UVW output terminals 17 and the PN input terminals 18 are arranged is oriented toward the side surface of the housing 2 (the motor housing 4), the junction box 25 may be mounted to the side surface of the housing 2 (the motor housing 4), which also provides the same advantages as this embodiment.

{Fifth Embodiment}

Next, a fifth embodiment of the present invention will be described using FIG. 7.

This embodiment is different from the above-described fourth embodiment in that a junction box 31 accommodating noise-removing filter circuit components also serves as the cover 10. Because the other configurations are the same as those according to the first and fourth embodiments, descriptions thereof will be omitted.

Figure 7:
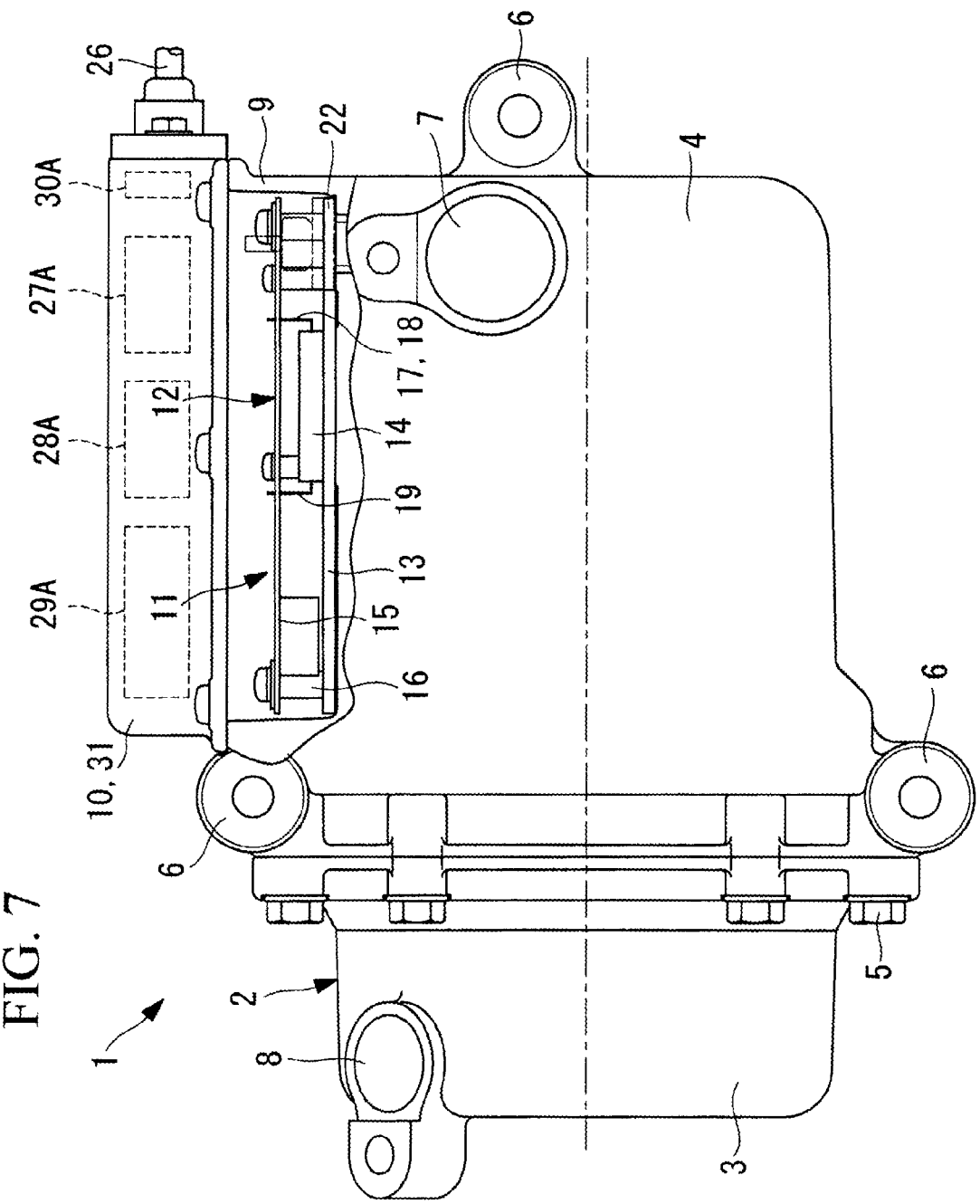
FIG. 7 is a partially cutaway side view of an inverter-integrated electric compressor according to a fifth embodiment of the present invention.

As shown in FIG. 7, this embodiment has a configuration in which the cover 10 securely fastened to the inverter box 9 also serves as the junction box 31, which accommodates high-voltage components, such as an inductor coil 27A, a common mode coil 28A, and a head capacitor 29A, constituting the noise-removing filter circuit of the inverter device 11.

In this case, the high-voltage cable 26 is connected to a PN terminal 30A provided in the junction box 31. Furthermore, this PN terminal 30A is disposed at a position facing the PN input terminals 18, which are arranged in the same row as the UVW output terminals 17 on one side of the IPM 14, and is electrically connected to the PN input terminals 18 of the IPM 14 via the high-voltage wiring path and the pattern (not shown) on the control board 15. The other configurations are the same as those according to the fourth embodiment.

Also with this configuration in which the filter circuit components, such as the inductor coil 27A, the common mode coil 28A, and the head capacitor 29A, are provided in the junction box 31, which also serves as the cover, provided on the top surface of the inverter box 9, it is possible to install high-voltage components, such as the inductor coil 27A, the common mode coil 28A, and the head capacitor 29A, constituting the filter circuit in the junction box 31, which also serves as the cover, and integrally attach them to the motor housing 4. Accordingly, similarly to the above-described fourth embodiment, it is possible to improve the ease of assembly of the inverter device 11, the layout flexibility, and the adaptability to a change in specifications, while achieving a reduction in size. Furthermore, noise transmission from the filter circuit components 27A, 28A, and 29A side to the inverter module (the inverter circuit) 12 side can be reduced, thereby suppressing the occurrence of malfunction or the like due to noise interference.

{Sixth Embodiment}

Next, a sixth embodiment of the present invention will be described using FIG. 8.

This embodiment is different from the above-described fifth embodiment in the configuration of the connection between the inverter module (inverter circuit) 12 and the high-voltage wiring path including the filter circuit components provided in the junction box 31. Because the other configurations are the same as those according to the first and fifth embodiments, descriptions thereof will be omitted.

Figure 8:
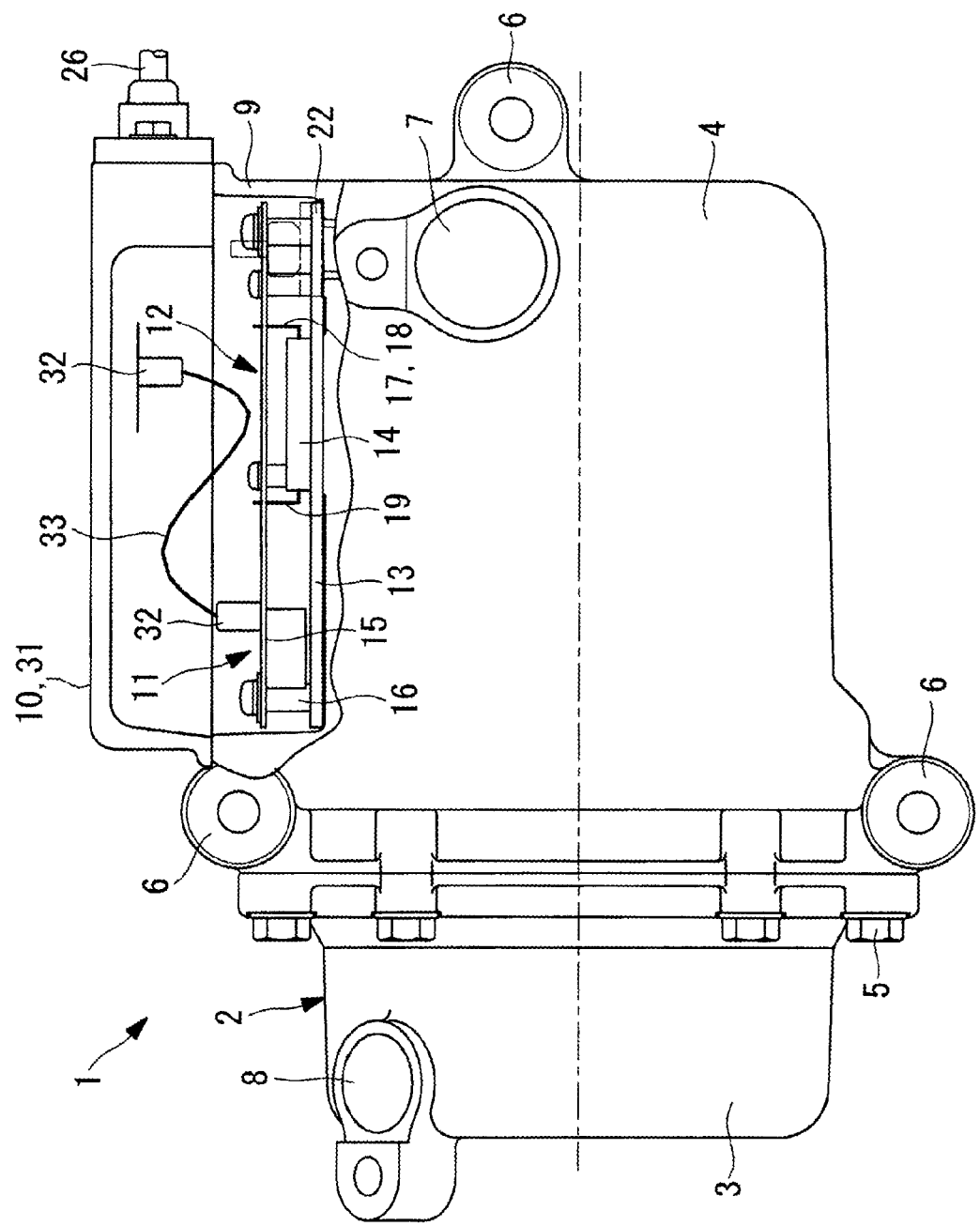
FIG. 8 is a partially cutaway side view of an inverter-integrated electric compressor according to a sixth embodiment of the present invention.

As shown in FIG. 8, this embodiment has a configuration in which the high-voltage wiring path including the filter circuit components 27A, 28A, and 29A provided in the junction box 31, which also serves as the cover, is connected to the inverter module (inverter circuit) 12 via a harness 33 that has plug-in terminals 32, e.g., faston terminals ("faston" is a registered trade name of The Whitaker Corporation), at both ends.

More specifically, it is configured such that counterpart terminals (not shown) are provided in the junction box 31, which also serves as the cover, and on the control board 15. By inserting direct-mount terminals called the plug-in terminals 32 at both ends into the counterpart terminals, the high-voltage wiring path in the junction box 31 is connected to the control board 15 of the inverter module (inverter circuit) 12 via the harness 33, and hence, is connected to the PN input terminals 18 of the IPM 14 via the pattern (not shown) on the control board 15.

In this manner, the high-voltage wiring path including the filter circuit components, which are provided in the junction box 31, s connected to the IPM 14 via the control board 15 and the harness 33 having the plug-in terminals 32 at both ends. Thus, the filter circuit components provided in the junction box 31, which also serves as the cover, can be connected to the IPM 14 via the harness 33 having the direct-mount terminals called the plug-in terminals 32. Accordingly, the wiring path can be simplified, reduced in size and cost, and improving in the ease of wiring. Note that, because electric cars have small vibrations and a low temperature compared with engine vehicles, the use of the plug-in terminals 32 does not cause trouble, such as detachment of the wiring lines. Thus, sufficient reliability can be ensured.

Note that the present invention is not limited to the invention according to the above-described embodiments, and it may be variously modified within a scope that does not depart from the spirit thereof. For example, in the above-described embodiment, although the example in which the inverter box 9 is formed integrally with the motor housing 3 has been described, a configuration in which the inverter box 9 is separately formed and integrated with the motor housing 4 is of course possible.

Furthermore, the above-described embodiments are configured such that the coolant intake port 7 is provided on the rear side of the motor housing 4, so that the low-pressure coolant gas is taken in from the motor housing 4 side and is circulated toward the compressor housing 3, and such that the inverter box 9 is provided on the outer periphery of the motor housing 4, from where the coolant gas is taken in. However, conversely, in a compressor configured to take the coolant from the compressor housing 3 side and discharge the compressed coolant from the motor housing 4 side, the inverter box 9 may be provided on the compressor housing 3.

Furthermore, although the examples in which the filter circuit components 27 to 29 or 27A to 29A, and the PN terminal 30 or 30A are provided in the junction box 25 or 31 have been described in the above-described embodiments, these filter circuit components may be accommodated in the inverter box 9. In such a case too, the layout of the UVW output terminals 17 and PN input terminals 18 of the IPM 14, the glass-sealed terminals 22, 22A, and 22B, etc., are the same as those according to the above-described embodiments.

REFERENCE SIGNS LIST 1 inverter-integrated electric compressor
2 housing
3 compressor housing
4 motor housing
7 coolant intake port
9 inverter box
11 inverter device
12 inverter module (inverter circuit)
13 metal base plate
14 intelligent power module (IPM)
15 control board
17 UVW output terminal
18 PN input terminal
19 microcomputer connecting terminal
20 microcomputer
22, 22A, 22B glass-sealed terminal
25, 31 junction box
26 high-voltage cable
27, 27A filter circuit component (inductor coil)
28, 28A filter circuit component (common mode coil)
29, 29A filter circuit component (head capacitor)
30, 30A PN terminal
32 plug-in terminal
33 harness

The invention claimed is:

1. An inverter-integrated electric compressor in which an inverter box is provided on an outer periphery of a housing accommodating a compressor and a motor, the inverter box integrally accommodating an inverter device, wherein
the inverter device includes an intelligent power module constituting an inverter circuit
the intelligent power module is a module in which a driving circuit, a self-protection function, and a switching circuit are mounted,
UVW output terminals arranged on one side of the intelligent power module are disposed so as to face, in the inverter box, UVW terminals of a glass-sealed terminal that applies power from the inverter device to the motor, and
the UVW output terminals of the intelligent power module and the UVW terminals of the glass-sealed terminal are connected via a pattern constituting a wiring path on a control board.

2. The inverter-integrated electric compressor according to claim 1, wherein
the glass-sealed terminal is disposed in the inverter box, at a rear end of the housing accommodating the motor, and
the intelligent power module is disposed such that the UVW output terminals thereof face a front portion of the glass-sealed terminal.

3. The inverter-integrated electric compressor according to claim 1, wherein
the housing comprises:
a compressor housing accommodating the compressor; and
a motor housing whose one end is connected to the compressor housing, and
the glass-sealed terminal is disposed in the inverter box, at a position corresponding to the other end of the motor housing, and
the intelligent power module is disposed such that the UVW output terminals thereof face the glass-sealed terminal.

4. The inverter-integrated electric compressor according to claim 1, wherein
the glass-sealed terminal is disposed in the inverter box, at a side of the housing accommodating the motor, and
the intelligent power module is disposed such that the UVW output terminals thereof are arranged along and inward of the glass-sealed terminal so as to face thereto.

5. The inverter-integrated electric compressor according to claim 1, wherein
the intelligent power module includes PN input terminals that are arranged in the same row as the UVW output terminals, and
a PN terminal to which a high-voltage cable from a power source is connected is disposed at a position facing the PN input terminals.

6. The inverter-integrated electric compressor according to claim 5, wherein a filter circuit component of the inverter device is connected to a wiring path between the PN input terminals of the intelligent power module and the PN terminal to which the high-voltage cable is connected.

7. The inverter-integrated electric compressor according to claim 5, wherein
the UVW output terminals and the PN input terminals are arranged on one side of the intelligent power module, and
the glass-sealed terminal and the PN terminal to which the high-voltage cable is connected are disposed on the same side so as to face the UVW output terminals and the PN input terminals.

8. The inverter-integrated electric compressor according to claim 5, wherein
the intelligent power module is disposed such that the side provided with the UVW output terminals and the PN input terminals is oriented toward a coolant intake port provided at the rear end of the housing, and
high-voltage circuit components including the intelligent power module are disposed near the coolant intake port.

9. The inverter-integrated electric compressor according to claim 1, wherein
microcomputer connecting terminals to be connected to a microcomputer are arranged on the intelligent power module, on a side opposite to the side provided with the UVW output terminals, and
the microcomputer is mounted on a control board of the inverter device, near the microcomputer connecting terminals, so as to face thereto.

10. The inverter-integrated electric compressor according to claim 9, wherein the control board is disposed above the intelligent power module.

11. The inverter-integrated electric compressor according to claim 6, wherein the filter circuit component is provided in a junction box that is mounted to the rear end of the housing.

12. The inverter-integrated electric compressor according to claim 6, wherein the filter circuit component is provided in a junction box mounted to a side surface of the housing.

13. The inverter-integrated electric compressor according to claim 6, wherein the filter circuit component is provided in a junction box that also serves as a cover and is provided on a top surface of the inverter box.

14. The inverter-integrated electric compressor according to claim 11, wherein a wiring path including the filter circuit component provided in the junction box is connected to the intelligent power module via a harness that has plug-in terminals.

15. The inverter-integrated electric compressor according to claim 9, wherein the intelligent power module and the control board are mounted on a metal base plate and are secured to a wall of the housing via the base plate in the inverter box.

16. The inverter-integrated electric compressor according to claim 12, wherein a wiring path including the filter circuit component provided in the junction box is connected to the intelligent power module via a harness that has plug-in terminals.

17. The inverter-integrated electric compressor according to claim 13, wherein a wiring path including the filter circuit component provided in the junction box is connected to the intelligent power module via a harness that has plug-in terminals.

18. The inverter-integrated electric compressor according to claim 1, wherein the UVW output terminals and PN input terminals are arranged in the same row as each other on one side of the intelligent power module, and microcomputer connecting terminals to be connected to a microcomputer are arranged on the opposite side of the intelligent power module, the glass-sealed terminal and a PN terminal to which a high-voltage cable from a power source is connected are disposed on the same side as each other at a position facing the UVW output terminals and the PN input terminals, a control board to which the UVW output terminals, the PN input terminals, and the microcomputer connecting terminals are connected and on which the microcomputer is mounted near a connecting position of the microcomputer connecting terminals is disposed above the intelligent power module and the UVW output terminals and the glass-sealed terminal are connected to each other via the pattern provided on the control board.

19. The inverter-integrated electric compressor according to claim 1, wherein the UVW output terminals of the intelligent power module penetrate the control board through through-holes and are soldered to the pattern on the control board.

* * * * *